(12) United States Patent
Potapov et al.

(10) Patent No.: US 7,480,662 B2
(45) Date of Patent: Jan. 20, 2009

(54) FACT TABLE STORAGE IN A DECISION SUPPORT SYSTEM ENVIRONMENT

(75) Inventors: Dmitry Potapov, Redwood City, CA (US); Vishwanath Karra, San Jose, CA (US); Amit Ganesh, San Jose, CA (US); Jonathan Klein, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 611 days.

(21) Appl. No.: 10/719,819

(22) Filed: Nov. 20, 2003

(65) Prior Publication Data

US 2005/0004936 A1   Jan. 6, 2005

Related U.S. Application Data

(60) Provisional application No. 60/484,908, filed on Jul. 3, 2003.

(51) Int. Cl.
*G06F 7/00* (2006.01)
*G06F 17/00* (2006.01)
*G06F 17/30* (2006.01)

(52) U.S. Cl. .................. 707/100; 707/2; 707/102

(58) Field of Classification Search .......... 707/2, 707/3, 103, 4
See application file for complete search history.

(56) References Cited

U.S. PATENT DOCUMENTS

| | | | |
|---|---|---|---|
| 5,848,408 A | 12/1998 | Jakobsson et al. |
| 5,870,743 A | 2/1999 | Cohen et al. |
| 5,873,101 A | 2/1999 | Klein |
| 5,873,102 A | 2/1999 | Bridge, Jr. et al. |
| 5,890,167 A | 3/1999 | Bridge, Jr. et al. |
| 5,956,704 A | 9/1999 | Gautam et al. |
| 5,956,705 A | 9/1999 | Stevens et al. |
| 5,963,932 A | 10/1999 | Jakobsson et al. |
| 5,991,754 A | 11/1999 | Raitto et al. |

(Continued)

FOREIGN PATENT DOCUMENTS

WO    WO 0133427 A2 *   5/2001

(Continued)

OTHER PUBLICATIONS

George Lumpkin, et al., Oracle Corporation, "Query Optimization in Oracle9i," An Oracle White Paper, Feb. 2002, pp. 1-29.

(Continued)

*Primary Examiner*—Mohammad Ali
*Assistant Examiner*—Patrick A Darno
(74) *Attorney, Agent, or Firm*—Hickman Palermo Truong & Becker LLP

(57) ABSTRACT

A fact table is set up without any dimension columns. The data in the table is ordered according to an order corresponding to the ordering of the dimensions. The table is divided into segments corresponding to contiguous portions of data. The portions of the table containing non-null values for the measures are placed into the segments. The size of the segments and the location segments may be determined according to the density of discontinuities in the data. An indexed organized table is used to determine the beginning and end of each segment of the table, the locations of the discontinuities in the data, and to facilitate accessing the measures of the table.

42 Claims, 11 Drawing Sheets

| Units sold (Col. 4) | Price ($) (Col. 5) | Disc. (%) (Col. 6) | |
|---|---|---|---|
| 457 | 15632.3 | 6.18% | } Segment 401 |
| 280 | 6222.07 | 2.32% | |
| 877 | 18966.2 | 4.27% | } Segment 402 |
| 518 | 97854.7 | 6.59% | |
| 879 | 99171.9 | 9.30% | |
| 967 | 68371.4 | 9.21% | |
| 611 | 27190.7 | 1.46% | |
| 455 | 11172.4 | 7.06% | |
| 821 | 4852.97 | 1.15% | |
| 855 | 95597.6 | 9.55% | |
| 208 | 86803.8 | 6.77% | } Segment 403 |
| 447 | 47557.9 | 8.77% | |
| 288 | 22467.7 | 7.68% | |
| 244 | 62034.9 | 6.58% | |
| 813 | 25857.4 | 6.67% | |
| 144 | 35043.1 | 7.98% | |
| 703 | 59178.6 | 1.41% | |

Table 4A

U.S. PATENT DOCUMENTS

| | | | |
|---|---|---|---|
| 6,003,036 A * | 12/1999 | Martin | 707/102 |
| 6,026,406 A | 2/2000 | Huang et al. | |
| 6,061,678 A | 5/2000 | Klein et al. | |
| 6,061,690 A | 5/2000 | Nori et al. | |
| 6,161,105 A | 12/2000 | Keighan et al. | |
| 6,173,313 B1 | 1/2001 | Klots et al. | |
| 6,185,577 B1 | 2/2001 | Nainani et al. | |
| 6,192,377 B1 | 2/2001 | Ganesh et al. | |
| 6,209,000 B1 | 3/2001 | Klein et al. | |
| 6,223,182 B1 | 4/2001 | Agarwal et al. | |
| 6,243,718 B1 | 6/2001 | Klein et al. | |
| 6,272,503 B1 | 8/2001 | Bridge, Jr. et al. | |
| 6,295,610 B1 | 9/2001 | Ganesh et al. | |
| 6,298,342 B1 * | 10/2001 | Graefe et al. | 707/4 |
| 6,345,272 B1 | 2/2002 | Witkowski et al. | |
| 6,353,828 B1 | 3/2002 | Ganesh et al. | |
| 6,374,232 B1 | 4/2002 | Dageville et al. | |
| 6,457,000 B1 * | 9/2002 | Witkowski et al. | 707/2 |
| 6,477,525 B1 | 11/2002 | Bello et al. | |
| 6,484,179 B1 * | 11/2002 | Roccaforte | 707/102 |
| 6,493,708 B1 | 12/2002 | Ziauddin et al. | |
| 6,493,726 B1 | 12/2002 | Ganesh et al. | |
| 6,496,819 B1 | 12/2002 | Bello et al. | |
| 6,510,421 B1 | 1/2003 | Ganesh et al. | |
| 6,546,394 B1 | 4/2003 | Chong et al. | |
| 6,549,901 B1 | 4/2003 | Loaiza et al. | |
| 6,574,717 B1 | 6/2003 | Ngai et al. | |
| 6,615,206 B1 | 9/2003 | Jakobsson et al. | |
| 6,631,374 B1 | 10/2003 | Klein et al. | |
| 6,636,870 B2 * | 10/2003 | Roccaforte | 707/104.1 |
| 6,647,510 B1 | 11/2003 | Ganesh et al. | |
| 6,684,203 B1 | 1/2004 | Waddington et al. | |
| 6,684,207 B1 | 1/2004 | Greenfield et al. | |
| 6,684,223 B1 | 1/2004 | Ganesh et al. | |
| 6,907,422 B1 * | 6/2005 | Predovic | 707/2 |
| 7,080,081 B2 * | 7/2006 | Agarwal et al. | 707/100 |
| 2002/0099743 A1 | 7/2002 | Workman et al. | |
| 2002/0194206 A1 | 12/2002 | Ganesh et al. | |
| 2003/0055832 A1 | 3/2003 | Roccaforte | |
| 2003/0204534 A1 | 10/2003 | Hopeman et al. | |
| 2003/0208503 A1 | 11/2003 | Roccaforte | |
| 2003/0212694 A1 | 11/2003 | Potapov et al. | |
| 2003/0220951 A1 | 11/2003 | Muthulingam et al. | |
| 2003/0223553 A1 | 12/2003 | Dalrymple | |
| 2003/0226134 A1 | 12/2003 | Sethi et al. | |
| 2003/0226135 A1 | 12/2003 | Sethi et al. | |
| 2004/0030954 A1 | 2/2004 | Loaiza et al. | |
| 2004/0039962 A1 | 2/2004 | Ganesh et al. | |

OTHER PUBLICATIONS

Rich Niemiec, Oracle Corporation, "Perspective Expert Advice, Using the New Bitmap Join Index," 2004, http://otn.oracle.com/oramag/oracle/02-may/o32expert.html?_template=/otn/content/print, data retrieved Feb. 23, 2004, pp. 1-4.

Oracle Corporation, "Oracle9i Index-Organized Tables, Data Sheet," Mar. 2002, http://otn.oracle.com/products/oracle9i/datasheets/iots/iot_ds.html?_template=/otn/content/print, data retrieved Feb. 23, 2004, pp. 1-4.

Paul Tsien, Oracle Corporation, "Oracle9i Online Data Reorganization and Redefinition," An Oracle White Paper, Aug. 2002, pp. 1-9.

Oracle Corporation, "Oracle8i and Oracle9i Data Reorganization and Feature Comparisons," An Oracle White Paper, Mar. 2002, pp. 1-12.

Shirley Ann Stern, Oracle Corporation, Oracle9i Index-Organized Tables Technical Whitepaper, An Oracle White Paper, Sep. 2001, pp. 1-10.

Oracle Corporation, "Oracle9i Database, Daily Feature, Oracle9i IOTs—Faster, More Available and Scalable Than Ever," 2004, http://otn.oracle.com/products/oracle9i/daily/sept04.html?_template=/otn/content/print, data retrieved Feb. 23, 2004, pp. 1-2.

* cited by examiner

| Comment | Fact Table | | | | | |
|---|---|---|---|---|---|---|
| Row #s | Date ID (Col.1) | Loc. ID (Col.2) | Prod. ID (Col.3) | Units sold (Col. 4) | Price ($) (Col. 5) | Disc. (%) (Col. 6) |
| 1 | 8 | 1 | 2 | 813 | 25857.4 | 6.67% |
| 2 | 3 | 1 | 1 | 877 | 18966.2 | 4.27% |
| 3 | 6 | 2 | 1 | 455 | 11172.4 | 7.06% |
| 4 | 8 | 2 | 2 | 703 | 59178.6 | 1.41% |
| 5 | 8 | 2 | 1 | 144 | 35043.1 | 7.98% |
| 6 | 2 | 1 | 2 | 280 | 6222.07 | 2.32% |
| 7 | 2 | 1 | 1 | 457 | 15632.3 | 6.18% |
| 8 | 3 | 1 | 2 | 518 | 97854.7 | 6.59% |
| 9 | 8 | 1 | 1 | 244 | 62034.9 | 6.58% |
| 10 | 7 | 2 | 2 | 288 | 22467.7 | 7.68% |
| 11 | 3 | 2 | 1 | 879 | 99171.9 | 9.30% |
| 12 | 6 | 2 | 2 | 821 | 4852.97 | 1.15% |
| 13 | 6 | 1 | 1 | 967 | 68371.4 | 9.21% |
| 14 | 7 | 2 | 1 | 447 | 47557.9 | 8.77% |
| 15 | 7 | 1 | 1 | 855 | 95597.6 | 9.55% |
| 16 | 7 | 1 | 2 | 208 | 86803.8 | 6.77% |
| 17 | 6 | 1 | 2 | 611 | 27190.7 | 1.46% |

PRIOR ART Table 1A

FIG. 1A

| Time Table | | |
|---|---|---|
| Date ID | Date | Day of Week |
| 1 | 1-Jan-03 | Wednesday |
| 2 | 2-Jan-03 | Thursday |
| 3 | 3-Jan-03 | Friday |
| 4 | 4-Jan-03 | Saturday |
| 5 | 5-Jan-03 | Sunday |
| 6 | 6-Jan-03 | Monday |
| 7 | 7-Jan-03 | Tuesday |
| 8 | 8-Jan-03 | Wednesday |

PRIOR ART Table 1B

FIG. 1B

| Product Table | | |
|---|---|---|
| Product ID | Product Name | Description |
| 1 | Lettuce | Romaine |
| 2 | Tomatoes | Plum |

PRIOR ART Table 1C

FIG. 1C

| Location Table | | | |
|---|---|---|---|
| Location ID | Location Name | Operation Info | Street Address |
| 1 | Chicago | | 1547 Fruit Street |
| 2 | New York | Closed Jan 2 | 1995 Salad Avenue |

PRIOR ART Table 1D

FIG. 1D

| Comment | Fact Table | | | | | |
|---|---|---|---|---|---|---|
| Previous Row #s | Date ID (Col.1) | Loc. ID (Col.2) | Prod. ID (Col.3) | Units sold (Col. 4) | Price ($) (Col. 5) | Disc. (%) (Col. 6) |
| 7 | 2 | 1 | 1 | 457 | 15632.3 | 6.18% |
| 6 | 2 | 1 | 2 | 280 | 6222.07 | 2.32% |
| 2 | 3 | 1 | 1 | 877 | 18966.2 | 4.27% |
| 8 | 3 | 1 | 2 | 518 | 97854.7 | 6.59% |
| 11 | 3 | 2 | 1 | 879 | 99171.9 | 9.30% |
| 13 | 6 | 1 | 1 | 967 | 68371.4 | 9.21% |
| 17 | 6 | 1 | 2 | 611 | 27190.7 | 1.46% |
| 3 | 6 | 2 | 1 | 455 | 11172.4 | 7.06% |
| 12 | 6 | 2 | 2 | 821 | 4852.97 | 1.15% |
| 15 | 7 | 1 | 1 | 855 | 95597.6 | 9.55% |
| 16 | 7 | 1 | 2 | 208 | 86803.8 | 6.77% |
| 14 | 7 | 2 | 1 | 447 | 47557.9 | 8.77% |
| 10 | 7 | 2 | 2 | 288 | 22467.7 | 7.68% |
| 9 | 8 | 1 | 1 | 244 | 62034.9 | 6.58% |
| 1 | 8 | 1 | 2 | 813 | 25857.4 | 6.67% |
| 5 | 8 | 2 | 1 | 144 | 35043.1 | 7.98% |
| 4 | 8 | 2 | 2 | 703 | 59178.6 | 1.41% |

Table 2A

FIG. 2A

| Time Table | | |
|---|---|---|
| Date ID | Date | Day of Week |
| 1 | 2-Jan-03 | Thursday |
| 2 | 3-Jan-03 | Friday |
| 3 | 6-Jan-03 | Monday |
| 4 | 7-Jan-03 | Tuesday |
| 5 | 8-Jan-03 | Wednesday |

Table 2B

FIG. 2B

| Comment | Fact Table | | | | | |
| --- | --- | --- | --- | --- | --- | --- |
| Row #s | Date ID (Col.1) | Loc. ID (Col.2) | Prod. ID (Col.3) | Units sold (Col. 4) | Price ($) (Col. 5) | Disc. (%) (Col. 6) |
| 1 | 1 | 1 | 1 | 457 | 15632.3 | 6.18% |
| 2 | 1 | 1 | 2 | 280 | 6222.07 | 2.32% |
| 5 | 2 | 1 | 1 | 877 | 18966.2 | 4.27% |
| 6 | 2 | 1 | 2 | 518 | 97854.7 | 6.59% |
| 7 | 2 | 2 | 1 | 879 | 99171.9 | 9.30% |
| 9 | 3 | 1 | 1 | 967 | 68371.4 | 9.21% |
| 10 | 3 | 1 | 2 | 611 | 27190.7 | 1.46% |
| 11 | 3 | 2 | 1 | 455 | 11172.4 | 7.06% |
| 12 | 3 | 2 | 2 | 821 | 4852.97 | 1.15% |
| 13 | 4 | 1 | 1 | 855 | 95597.6 | 9.55% |
| 14 | 4 | 1 | 2 | 208 | 86803.8 | 6.77% |
| 15 | 4 | 2 | 1 | 447 | 47557.9 | 8.77% |
| 16 | 4 | 2 | 2 | 288 | 22467.7 | 7.68% |
| 17 | 5 | 1 | 1 | 244 | 62034.9 | 6.58% |
| 18 | 5 | 1 | 2 | 813 | 25857.4 | 6.67% |
| 19 | 5 | 2 | 1 | 144 | 35043.1 | 7.98% |
| 20 | 5 | 2 | 2 | 703 | 59178.6 | 1.41% |

Table 3

FIG. 3

| Units sold (Col. 4) | Price ($) (Col. 5) | Disc. (%) (Col. 6) |
|---:|---:|---:|
| 457 | 15632.3 | 6.18% |
| 280 | 6222.07 | 2.32% |
| 877 | 18966.2 | 4.27% |
| 518 | 97854.7 | 6.59% |
| 879 | 99171.9 | 9.30% |
| 967 | 68371.4 | 9.21% |
| 611 | 27190.7 | 1.46% |
| 455 | 11172.4 | 7.06% |
| 821 | 4852.97 | 1.15% |
| 855 | 95597.6 | 9.55% |
| 208 | 86803.8 | 6.77% |
| 447 | 47557.9 | 8.77% |
| 288 | 22467.7 | 7.68% |
| 244 | 62034.9 | 6.58% |
| 813 | 25857.4 | 6.67% |
| 144 | 35043.1 | 7.98% |
| 703 | 59178.6 | 1.41% |

Rows 1–2: Segment 401
Rows 3–5: Segment 402
Rows 6–17: Segment 403

Table 4A

FIG. 4A

| IOT | | | |
|---|---|---|---|
| Address of Ref. Location | Comp. Index | Length of Segment | Block Length |
| 434B4 | (1,1,1) | 2 | 2 |
| 1456A | (2,1,1) | 3 | 3 |
| A34E7 | (3,1,1) | 12 | 4 |

Table 4B

FIG. 4B

|  | Units sold (Col. 4) | Price ($) (Col. 5) | Disc. (%) (Col. 6) |  |
|---|---|---|---|---|
| Contiguous Region 511 | 457 | 15632.3 | 6.18% | Segment 501 |
|  | 280 | 6222.07 | 2.32% |  |
| Contiguous Region 512 | 877 | 18966.2 | 4.27% |  |
|  | 518 | 97854.7 | 6.59% |  |
|  | 879 | 99171.9 | 9.30% |  |
| (2, 2, 2) |  |  |  |  |
|  | 967 | 68371.4 | 9.21% | Segment 502 |
|  | 611 | 27190.7 | 1.46% |  |
|  | 455 | 11172.4 | 7.06% |  |
|  | 821 | 4852.97 | 1.15% |  |
|  | 855 | 95597.6 | 9.55% |  |
|  | 208 | 86803.8 | 6.77% |  |
| Contiguous Region 513 | 447 | 47557.9 | 8.77% |  |
|  | 288 | 22467.7 | 7.68% |  |
|  | 244 | 62034.9 | 6.58% |  |
|  | 813 | 25857.4 | 6.67% | Segment 503 |
|  | 144 | 35043.1 | 7.98% |  |
|  | 703 | 59178.6 | 1.41% |  |
| (6, 1, 1) | 812 | 41234.7 | 2.41% |  |

Table 5A

FIG. 5A

| IOT | | | | | | | | | |
|---|---|---|---|---|---|---|---|---|---|
| Address | Comp. Index | Length of Segment | Block Length | Min. Date ID | Max. Date ID | Min. Loc. ID | Max. Loc. ID | Min. Prod. ID | Max. Prod. ID |
| 434B4 | (1,1,1) | 2 | 2 | 1 | 1 | 1 | 1 | 1 | 2 |
| 1456A | (2,1,1) | 12 | 4 | 2 | 4 | 1 | 2 | 1 | 2 |
| B35A7 | (5,1,1) | 5 | 5 | 5 | 6 | 1 | 2 | 1 | 2 |

Table 5B

FIG. 5B ically, there is a different table for each dimension. To improve
access to the dimension tables, bitmap indexes or B-tree
indexes (not shown) may be built on the columns. The dimension columns of Table 1A contain references to rows in the
individual dimension tables. The individual dimension tables
provide a translation between the reference or identification
number used in the six-column fact table, and the names more
commonly used for the reference numbers. The rows of

FACT TABLE STORAGE IN A DECISION SUPPORT SYSTEM ENVIRONMENT

RELATED APPLICATIONS

This application claims priority benefit of U.S. Provisional Patent Application, Ser. No. 60/484,908, filed Jul. 3, 2003, which is hereby incorporated by reference in its entirety.

FIELD OF THE INVENTION

The field of the invention is data structures in general, and more specifically the organization of tables.

BACKGROUND OF THE INVENTION

Data is often organized into tables that are divided into rows and columns. Any given piece or set of data may be associated with one or more dimensions. In the context of database systems, a "dimension" is a list of values that provide categories for data. A dimension acts as an index for identifying values of a variable. For example, if sales data has a separate sales figure for each month, then the sales data has a TIME dimension. That is, the data is organized by time. Similarly, if separate sales values are stored for each product, then the sales data has a PRODUCT dimension.

Some of the columns of a table may correspond to dimensions, while others may represent the measures, which are quantities of interest. For example, a sales table may have a date column, a product identification column, and a location column for respectively storing values associated with the TIME, PRODUCT, and LOCATION dimensions. In addition, the sales table may include columns for storing various measures, such as the number of products sold, the price of the products, and the discounts offered.

FIG. 1A shows a Table 1A that includes one column for each of the TIME, PRODUCT, and LOCATION dimensions. Specifically, Col. 1, Col. 2, and Col. 3 of Table 1A correspond to dimension keys. In addition to the dimension columns, Table 1A includes Col. 4, Col. 5, and Col. 6, which store measures. In FIG. 1A, the Row ID column is not part of Table 1A, but has been placed in FIG. 1A to simplify explanations that appear later in this application.

Table 1A illustrates a simplified case in which there are only two products and two locations. Table 1A shows only Date IDs 1-7. There are several combinations of dimension values for which Table 1A does not have any data. For example, in Table 1A there are no entries for the Date ID, Location ID, Product ID tuples of (2,2,1), (2,2,2), and (3,2,2). Table 1A also does not have any entries having Date IDs 4 or 5. The rows of Table 1A have no particular order. The location of rows within Table 1A may be determined by space management considerations, and may differ depending on the order in which the various rows and columns have been recorded and updated, for example.

FIGS. 1B-D illustrate block diagrams of examples of dimension tables. Each dimension column of Table 1A is associated with a dimension table, giving further information associated with the various values of the dimension. Typically, there is a different table for each dimension. To improve access to the dimension tables, bitmap indexes or B-tree indexes (not shown) may be built on the columns. The dimension columns of Table 1A contain references to rows in the individual dimension tables. The individual dimension tables provide a translation between the reference or identification number used in the six-column fact table, and the names more commonly used for the reference numbers. The rows of Tables 1B-1D would not be stored in any particular order. Nonetheless, the rows of FIGS. 1B-1D are illustrated in numerical order so that it is easier to follow the discussion in the remainder of the application.

FIG. 1B shows a Table 1B, which is the dimension table for time. Table 1B has three columns for Time ID, Date, and Day of the Week. Table 1B gives a translation between the Time ID and the calendar date. Additionally, the day of the week column gives the day of the week that corresponds to the date in the Date column. Although not illustrated in this example, the Time table may have any number of other columns giving other information about each day, such as whether the day is a federal or company holiday in addition to, or instead of, any of the columns in FIG. 1B.

As can be seen from Table 1B, Date ID 1 corresponds to Jan. 1, 2003, and Date IDs 4 and 5 correspond to Saturday and Sunday, respectively. In this example, the reason there are no entries having Date IDs 1, 4, and 5, is because the business represented by Table 1A was closed on Jan. 1, 2003 and is normally closed on Saturdays and Sundays.

FIG. 1C shows Table 1C, which is an example of a Product table. Table 1C includes a Product ID column, a product name column, and a description column. The Product ID column gives the Product ID used in Table 1A for the product named in the product name column, and thereby provides a translation between the Product ID and product name. In this example, the description column provides a further description about the product.

FIG. 1D shows Table 1D, which shows an example of a Location table. Table 1D includes a Location ID column, a location name column, an operation info column, and a street address column. The Location ID column gives the Location ID used in Table 1A for the location named in the location name column, and thereby provides a translation between the Location ID and location name. In this example, the Operation Info column provides information specific to the operations of the location of that row. Specifically, in Table 1D the Operation Info column indicates that Location 2 is closed on January 2, and consequently there are no entries for Location 2 on Jan. 2, 2003 in Table 1D (therefore, as mentioned above, Table 1A does not have any rows corresponding to tuples (2,2,1) or (2,2,2)). The Street Address column provides the street address of the location of the same row. Based on Tables 1B-1D and the absence of an entry in Table 1A having tuple (3,2,2), it can be deduced that there were no sales on Product 2 at Location 2 on Jan. 3, 2003.

It is desirable to access the table efficiently (quickly and/or with a minimal amount of computing). Searching for nonexistent rows may add to the time required to find data, and may thereby contribute to inefficiencies.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A shows an example of a prior art fact table.

FIG. 1B shows an example of a prior art dimension table for a set of times.

FIG. 1C shows an example of a prior art dimension table for a set of products.

FIG. 1D shows an example of a prior art dimension table for a set of locations.

FIG. 2A shows an example of ordering of the fact table of FIG. 1A, according to an embodiment of the invention.

FIG. 2B shows an example of a renumbering of the Date IDs of the fact table of FIG. 1A.

FIG. 3 shows the table of FIG. 2A using the Date IDs of FIG. 2B.

FIG. 4A is the same table as FIGS. 2 or 3, except the dimension columns have been removed, according to an embodiment of the invention.

FIG. 4B shows an example of an indexed organized table corresponding to the table of FIG. 4A, according to an embodiment of the invention.

FIG. 5A is the same table as FIG. 4A, except with two additional row added.

FIG. 5B shows an example of an indexed organized table corresponding to the table of FIG. 5A, according to an embodiment of the invention.

DETAILED DESCRIPTION OF SOME EXAMPLES OF THE INVENTION

Figure 4C:
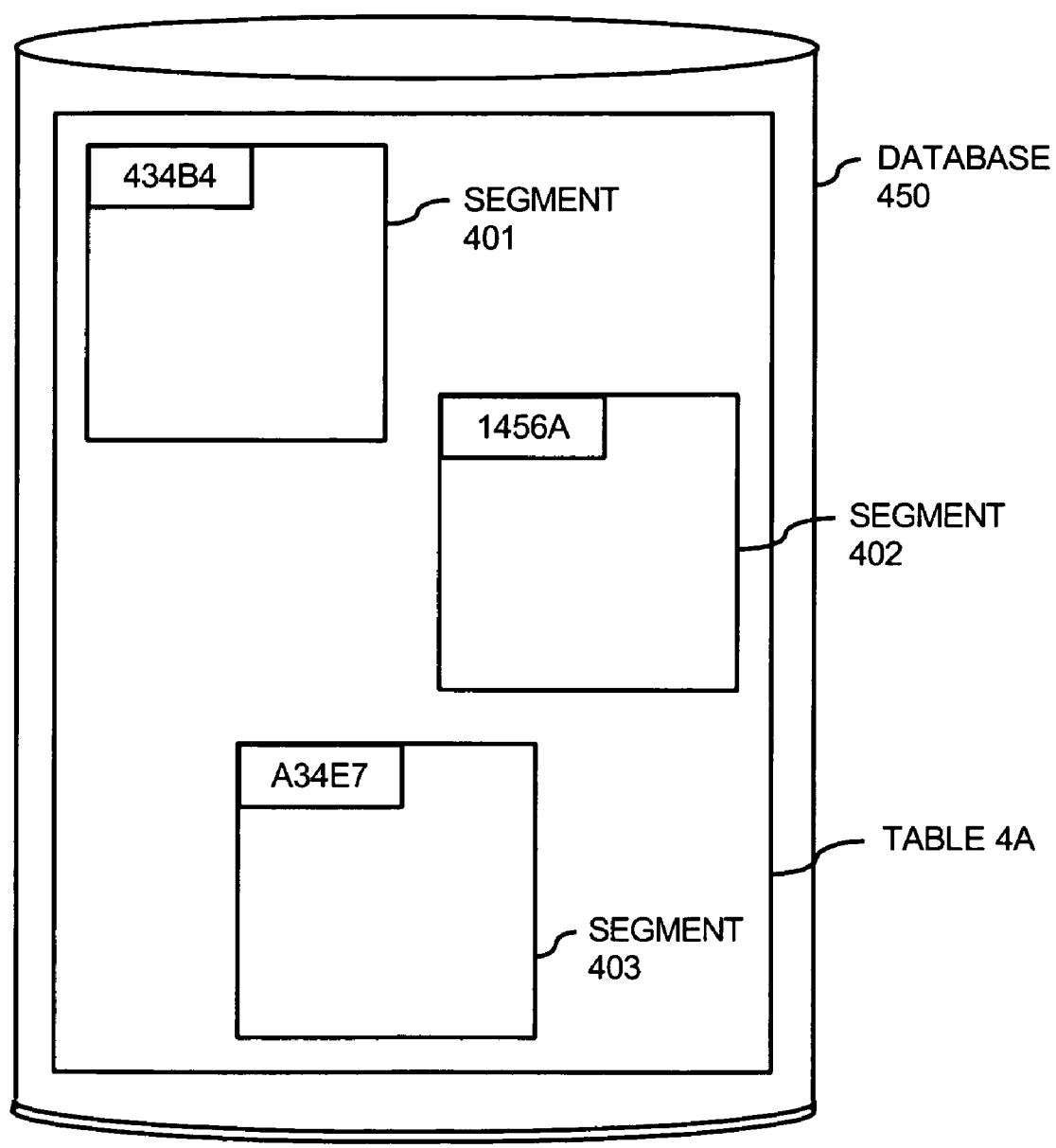
FIG. 4C is a block diagram of a database in which the table of FIG. 4A is stored.

The present method of storing and organizing data related to fact tables provides several features that can each be used independently of one another or with any combination of the other features. Although many of the features of the present method of storing and organizing fact tables are motivated by the problems explained above, any individual feature may not address any of the problems discussed above or may only address one of the problems discussed above. Some of the problems discussed above may not be fully addressed by any of the features of the present method of storing and organizing data related to fact tables. Although headings are provided, information related to a particular heading, but not found in the section having that heading, may also be found elsewhere in the specification.

Functional Overview

A variety of embodiments of fact tables and related tables are provided that differ from prior art fact tables in that (1) the rows are ordered, (2) the dimension columns are removed, and (3) an Indexed Organized Table (IOT) is used to locate records associated with specific dimension values within the resulting ordered-dimensionless fact table. The fact table is "dimensionless" only in the sense that the dimension columns have been removed. However, each location in the fact table is nonetheless associated with a dimension value combination. Each segment corresponds to a contiguous range of dimension value combinations separated from other contiguous regions by discontinuities or gaps in the data. The ordering of the fact table rows allows the dimension columns to be removed, thereby using less memory when compared to an equivalent prior art fact table. The IOT entry for a particular segment identifies the start and end of the corresponding segment of data, so that rows that would be located within the gaps between the contiguous segments do not need to be searched for. Using the information in the IOT related to the start and end of a segment, the rows within the contiguous regions of data may be addressed using a reference location (e.g., the start of the segment) and an offset. The dimension value combination of any given row is determined according to (1) the location of the row within the (ordered and dimensionless) fact table and (2) the information in the IOT.

In an embodiment, the segments of the fact table are further divided into blocks (which may be equal in size to other blocks within the same segment), and locating a row further includes identifying the block number within which it is located, and an offset from a reference location within the block (e.g., the start of the block). For example, in an embodiment, the IOT includes an identification of the first row of each segment and the length of the segment. In an embodiment, the IOT also includes the size of the blocks within each segment. In an embodiment, the IOT entries also include other nonkey information that aids in searching for data more quickly, locating the gaps or discontinuities between the segments.

A prior art fact table may be converted into one of the presently disclosed fact tables by a computer-implemented method in which the rows are ordered, the dimension columns removed, and an IOT is built. Alternatively, at inception of a fact table, it may be arranged so that it is ordered, dimensionless, and has an IOT identifying its segments, such that from the ordering of table and the information in the IOT, the fact table can be searched based on dimension value combinations.

Although described in terms of rows, each dimension may be treated as one axis in a multidimensional coordinate system (or space), and the segments and blocks may be a variety of multidimensional shapes within this space. The corresponding IOT includes information related to the boundaries of the segment. For example, if the segments are rectangular blocks, then the length of the block along each dimension may be included in the IOT. A variety of other embodiments are described below.

Ordering of Dimensions

FIG. 2A shows an example of an ordering of Table 1A. In FIG. 2A, the rows of the fact table are ordered according to their dimension value combinations so that the dimension value combinations associated with a row corresponds to the location of the row within the table. There may be several aspects included in the ordering. Specifically, the values within some dimensions may not have a specific order. For example, the "location" dimension may include the values "North," "South", "East," and "West." There is no inherent ordering in these dimension values. Therefore, part of ordering the fact table may involve imposing an order on otherwise unordered values within a dimension. The imposition of order may be accomplished by assigning a number to each of the dimension values, for example. The numbers assigned to the dimension values may then be used to dictate the relative ordering of the dimension values. The assignment of numbers to dimension values may be accomplished in part by dimension tables, such as the Location table and Product table of FIGS. 1C and D.

Another aspect of the ordering is deciding upon a hierarchy or ordering of the dimensions relative to each other. In the example of FIG. 2A, the dimensions have been ordered: "Date", "Location", "Product". Thus, every row of Table 2A is associated with a dimension value combination (x,y,z), where x corresponds to the date dimension value, y corresponds to the location dimension value, and z corresponds to the product dimension value.

Another aspect of the ordering may be an assignment of a single index value for composite index values. For example, each dimension value combination (each tuple) may be used as a composite index.

Assigning Dimension Values to Remove Known Gaps

Dimension value assignment may relate to not assigning dimension IDs that correspond to rows that do not exist, because there is no corresponding entry for the measure columns. In other words, a numbering system for a dimension may be chosen that eliminates certain rows in the table that are known to never have any entries. For example, if a business is always closed on Saturdays, Sundays, and Federal holidays, there will never be any entries in the corresponding locations in the table. The corresponding calendar dates may be skipped during the ordering process. In other words, while ordering the rows in this manner, combinations (tuples) of Date ID, Location ID, and Product ID that do not have a corresponding row may be skipped.

As an example, in FIG. 2B, Table 2B shows an ordering of the date dimension in which Jan. 2, 3, 6, and 7, 2003 are assigned Date IDs 1, 2, 3, and 4, respectively, while Jan. 1, 4, and 5, 2003 are not assigned Date IDs, thereby eliminating the corresponding nonexistent rows from the resulting table.

As another example, in FIG. 3, the contents of Table 1A have been reordered using the Date IDs of FIG. 2B, removing New Years, Saturday, and Sunday resulting in Table 3. Also, the Row # shown in the second comment column of FIG. 3 may be used as a composite index. However, if the Row # is used as a composite index for the row, a corresponding row arithmetic or table for converting the dimension value combinations into Row #s would also be included in such embodiments. Although in the above examples the Date ID, Location ID, and Product ID have a single component, any one of or any combination of the Date ID, Location ID, and Product ID may have a plurality of components. For example, the Date ID may have one component for one of or any combination of the year, quarter, month, and/or week in addition to a component for the day. Similarly, the Location ID may have a component for the country, state, county, city, Post Office, zipcode, and/or street, and the Product ID may have a component for the product size, type species, and/or quality, for example.

The Removal of Dimension Columns

Because the rows of the fact table have been ordered, based upon the dimension value combinations, the location of a row within the fact table will indicate the dimension value combination of the row. Consequently, the dimension columns may be removed from the fact table without losing the correlation between the dimension values and the rows. Storage space can be saved by the removal of the dimension columns, which no longer need to be traversed during a search of the table.

For example, Table 4A is the same as Table 2A or Table 3 except Cols. 1-3, the dimension columns, of FIG. 2A or FIG. 3 are removed leaving Cols. 4-6, as the resulting Table 4A. The segments indicated on FIG. 4A are regions of contiguous data discussed below.

Although it is technically possible to reorder the data such that there are no missing rows in the in the reordered table, this may not be convenient because then it would be necessary to include a complicated arithmetic or one or more tables for keeping track of the dimension value combinations that do not appear in the table. Therefore, after the ordering, there may still be regions in the resulting table having missing rows. In other words, after the ordering, there may be some dimension value combinations that do not have a corresponding row.

Segments

To improve access, the fact table may be divided into segments of contiguous data. In FIG. 4A, three segments of contiguous data are indicated. Specifically, segment 401 covers the range (1,1,1) to (1,1,2), segment 402 covers the range (2,1,1) to (2,2,1), and segment 403 covers the range (3,1,1) to (5,2,2). As indicated in Table 3, segment 401 and segment 402 are separated by the nonexistence of rows in the range (1,2,1) to (1,2,2). Similarly, segment 402 and segment 403 are separated by the nonexistence of a row for (2,2,2).

Blocks of the Segments

Each segment may be divided into blocks. The block size may be a multiple of the smallest block of data that the underlying physical system retrieves. The size of the smallest block that the underlying physical system is capable of retrieving is the minimum block size of the segment. The minimum block size (and consequently size of the blocks of a given segment) may be a larger chunk of memory than the memory typically allocated for a single row. In an embodiment, each block of the segment is a relatively small chunk of data that will be retrieved simultaneously by the system.

To simplify computing which block to access to retrieve a particular row, it is desirable to set all of the blocks in a segment such that they have the same number of rows and the same physical size in memory. If the rows are of different sizes, the blocks having smaller rows may be padded with empty spaces to keep the physical block sizes of segment the same. If the number of rows cannot be divided among an integral number of blocks, one or more blocks may have vacant space. Alternatively, the segment may be divided into two (or more) segments in which each has blocks that have a size that is equal to that of the other blocks of the same segment, but the size of the blocks of one segment differs from the size of the blocks of another segment. For example, if a segment has 5,003 rows, it may be divided into a segment having 2000 rows in which the blocks are 4 rows each and a segment of 3003 rows in which the blocks are 3 rows each.

IOT

To improve access to the fact table and to keep track of the beginning and ending of contiguous regions of data, an IOT may be built containing information about the segments. The entries in the IOT may be the address of a reference location, an index value of the reference row in the segment, and the length of the segment. Similar to the reference row of the block, the reference row of the segment may be the first row in the segment. Also, the reference location may be the starting address of the segment. Alternatively, another easily identified or uniquely positioned row may be used as a reference row of the segment. Similarly, the address of another easily identified or uniquely positioned location corresponding to the reference row may be used as a reference location of the segment. For example, the reference location may be the first address or last address of the reference row. In an embodiment, the first and last row of a segment may be included in each row of the IOT in addition to or instead of the length of the segment. It is desirable to reduce the number of segments, because the number of entries in the IOT is thereby reduced, which improves the access time.

As an example, FIG. 4B is an IOT, corresponding to Table 4A of FIGS. 4A. The first column of Table 4B gives the addresses of the start locations, and the second column gives the composite index of the first row each of segments 401, 402 and 403 of Table 4A. FIG. 4C shows database 450, which stores Table 4A having segments 401, 402 and 403. The address of the first bit of each of segments 401, 402, and 403 is indicated in the upper left hand corner of the segment. In FIGS. 4B and 4C segment 401 begins with start address 434B4, segment 402 begins with start address 1456A, and segment 403 begins with start address A34E7. In FIG. 4B, segment 401 has composite index (1,1,1), and is two rows long as indicated in the Length of Segment column. Consequently, segment 401 includes rows (1,1,1) and (1,1,2). Segment 402 begins with composite index (2,1,1), is three rows long as indicated in the length of segment column, and therefore includes rows (2,1,1), (2,1,2), and (2,2,1). Segment 403 begins with composite index (3,1,1), is 12 rows long as indicated in the length of segment column, and therefore contains rows (3,1,1), (3,1,2), (3,2,1), (3,2,2), (4,1,1), (4,1,2), (4,2,1), (4,2,2), (5,1,1), (5,1,2), (5,2,1), and (5,2,2). Conveniently, the block length of 4 rows fits evenly into the third segment. Each row of the IOT may include other nonkey information or meta data to facilitate searching the fact table some examples of which will be discussed below in conjunction with FIG. 5B.

Accessing a Segment

The individual rows within each block may be addressed by the row's offset from a reference location (e.g., a reference row) of the block. Thus, to access a particular row of the fact table, the segment, the block in that segment, and an offset from the reference row, such as the first row in the block, needs to be determined. To determine the segment, block, and offset within the block, first an IOT entry associated with the dimension value combination of the row of interest is found. Next, an offset from the reference row of the segment to the row of interest is calculated. Using the offset from the segment's reference row to the row of interest, the block containing in that segment is computed. Then an offset from the reference row in the block to the row of interest is computed. Alternatively, other easily identifiable rows or locations may be used as the reference row or location. For example, the last row or the middle row may be used as a reference row and the offset within the block may be calculated from the last or middle row respectively. Consequently, in an embodiment, a Row ID may have at least two components. The first component may be the block number, and the second component may be the offset within the block.

The IOT may be organized as a B-tree. The B-tree may include a root node, which may have branches. The indexes of the IOT are divided into ranges, and each range is located on a different branch. Each branch may have branches branching from it corresponding to sub-ranges into which each range is divided. The tree may include many different levels of branches each corresponding to a sub-range within the range of the node from which it branches. The leaves of the tree are the indexes identifying the reference row or all of the rows in each segment or block. Alternatively, the IOT may be organized as a bitmap tree having the same branches as the B-tree. However, the leaves are replaced with bit vectors containing one bit for each row of the table located in one of the segments, and each bit has a first value (e.g., 0) if the row is in the segment, and a second value (e.g., 1) if the row is not in the segment.

In the above embodiments, the dimension IDs were ordered and numbered so that the resulting set of data could be treated one-dimensionally using the Row #s or dimension tuples to identify the region of the data in a given segment. In an alternative embodiment, numbered and ordered tuples of individual dimension value combinations may be treated in a multidimensional fashion. In this embodiment, the segment of contiguous data may have different shapes, and may have multiple entries in the IOT (e.g., the length of the segment along each dimension) identifying the boundaries of the segment. The segments may have different sizes and shapes. The blocks may be multidimensional regions within the segments that may have the same shape as the segments or may have different shapes than the segments. An advantage to using one-dimensional segments is that only the length and a reference row or the first and last row of the segment needs to be stored to know the length of the segment.

Adding Dummy Rows to Merge Segments

If two contiguous regions are each separated from the other contiguous region by just one row or just a relatively small number of rows, it may be desirable to add dummy rows for the missing rows between the contiguous regions (forming one large contiguous regions), and then place the two or more contiguous regions into one segment. The amount of wasted memory in adding an additional row is relatively negligible, but the improvement in access time by having just one large segment rather than many smaller segments may be significant. Similarly, in regions of the fact table having many small regions of contiguous data that are close together, it may be desirable to place all of the small contiguous regions into one large segment by adding dummy rows for the missing rows. The size and the location of the segments may be determined according to the density of discontinuities in the data. Also, the dimension values may be altered or added to create gaps in the data where there were no gaps in the original data. In this way, for at least certain types of data, the gaps may be arranged so that all gaps have the same size and/or occur at equal intervals, simplifying the computations necessary to finding discontinuities in the data. In an embodiment, instead of actually filling the gaps with empty rows, the number of gaps, and the locations and/or intervals at which they occur may be indicated in the IOT.

The indexes used to reference each row may be tuples of the dimension ID values, in which each tuple has one entry for each dimension. For example, a tuple may include a Product ID, Date ID, and Location ID. The tuple may be used as a combined index. Alternatively, it may not be necessary to specify all dimensions to uniquely determine a row or to uniquely determine a block. For example, depending on the nature of the data in the fact table, there may be dimensions that are not primary keys or there may be a choice as to which combination of dimensions are used as primary keys (to uniquely specify each row). Alternatively a combined index may be used in which the tuples are ordered and replaced with a single column of numbers.

FIG. 5A shows Table 5A, which is the same fact table as Table 4A (FIG. 4A) except that Table 5A has a dummy row added at the row corresponding to tuple (2,2,2), having Row ID 8 (missing from Table 3), and an additional row has been added corresponding to tuple (6,1,1), which has Row ID 21 (also missing from Table 3). FIG. 5A also indicates segment 501, segment 502, segment 503, contiguous region 511, contiguous region 512, and contiguous region 513, which are discussed further below in conjunction with Table 5B.

FIG. 5B shows Table 5B, which is another example of an IOT. Table 5B is the IOT that corresponds to the fact table of FIG. 5A, Table 5A. FIG. 5B demonstrates dividing a segment into two segments each having different block sizes, and combining segments by adding a dummy row. In the example of FIG. 5B, each block is identified by a tuple that contains an entry for the Date ID, Location ID, and Product ID.

Table 5A has three contiguous regions (contiguous region 511, contiguous regions 512, and contiguous region 513). Since there is only one row missing between contiguous region 512 and contiguous region 513 segments of data, a dummy row was added thereby joining contiguous region 511 and contiguous region 512 into one contiguous region.

The IOT, Table 5B, uses the tuple indices as composite indices. The first segment, segment 501, begins with row (1,1,1), has two rows as indicated by the length of segment column, and therefore includes rows (1,1,1) and (1,1,2). The second segment, segment 502, begins with row (2,1,1), has 12 rows as indicated by the length of segment column, and therefore includes rows (2,1,1), (2,1,2), (2,2,1), (2,2,2), (3,1, 1), (3,1,2), (3,2,1), (3,2,2), (4,1,1), (4,1,2), (4,2,1), and (4,2, 2). The third segment, segment 503, starts with row (5,1,1), has five rows as indicated by the length of segment column, and therefore includes rows (5,1,1), (5,1,2), (5,2,1), (5,2,2), and (6,1,1). Since the combined contiguous region (the combination of contiguous region 512, row (2,2,2), and contiguous region 513) has 17 rows (and similarly the original contiguous region 513 had 13 rows), the resulting combined contiguous region cannot be spanned by a plurality of identically sized blocks (unless each block has only one row). Therefore, the last segment has been divided into two segments. The first segment, segment 502, is divided into blocks of four rows, and the remaining segment, segment 503, is one block of 5 rows. In Table 5B, each row also contains the maximum and minimum values of the dimension IDs in the corresponding segment as nonkey information.

In an embodiment, the block lengths could be kept all the same size, and there is no entry for the block length in the IOT, because all segments have the same size block length. Dummy rows could be added to segments that have a number of rows that cannot be allocated to an integral number blocks. For example, if all segments have blocks that are four rows long, and one segment has 13 rows, three dummy rows or space equivalent to three dummy rows could be added to the last block of the segment, so that the resulting segment is 16 rows long, and has four blocks.

Changes in Dimensions and Cardinality

A table may be reorganized at a certain point in time to account for changes in cardinality or dimensionality. For example, a new value for the Product ID may be added to the Product dimension, (because the company starts selling a corresponding new product). Similarly, time is always increasing, so there will be new dimension values for time being added nearly continuously. If the dimensionality changes or the cardinalities of the dimension changes, then the Row ID arithmetic within the segment may be affected. Consequently, another parameter that may be included as part of the nonkey information in the IOT is the cardinality or dimensionality (e.g., the total number of dimensions, and/or the total number or maximum dimension value of Product IDs, Date IDs, and/or Location IDs) at the time the segment was loaded to indicate how to properly perform the Row ID arithmetics within the segment. The changing of the cardinality or dimensionality may introduce gaps where there may not have previously been any gaps.

For example, if a third product is added to the fact tables, Table 2A or 3, two null valued rows would be added within each set of rows having the same Date ID. Similarly, if for example there was initially only one customer, and upon gaining a second customer a new CUSTOMER dimension is added for the two customers, having two Customer ID values (Customer 1 and Customer 2), then a gap of four null rows may be added to each Date ID. However, the previous segments that now have gaps, but are otherwise unchanged, do not need to be split into smaller segments. By keeping track of the dimensionality at the time the segment was made, each segment can still be searched as if the new dimensions or the new dimension values were never added.

Minimum Dimension Value Entries in the IOT

It may be desirable to number some dimensions in a manner such that the lowest dimension value is a number other than 1. This numbering may introduce gaps in the otherwise contiguous ranges of dimension value combinations. Consequently, it may be desirable to add an entry to the IOT for the minimum dimension value of one or more dimensions. Using the minimum dimension value, dividing an otherwise contiguous range of dimension value combinations into multiple segments can be avoided, because the Row ID arithmetic can use the minimum dimension value to properly calculate the offset from the reference location of the segment. For example if the minimum Product ID value is 100, and if there are only two products 100 and 101. Then, using the minimum Product ID entry of 100, the number of rows between dimension value combinations (1,1,100) and (1,2,101), can be determined to be only two (i.e., the rows having the dimension combinations of (1,1,101) and (1,2,100)).

One Dimensional Fact Tables

Although the above embodiments have been described using an example in which the fact table has three dimensions, any number of dimensions may be used, including one dimension. For example, any of the embodiments may be used with a one dimensional table, which is useful in On-Line Transaction Processing (OLTP) environments. In some environments, a surrogate primary key is created. The surrogate primary key may be a fictitious dimension. In an embodiment, the surrogate primary key may be used for, or as part of, the composite index. For example, the tuples that make up the composite indexes (1,1,1), (1,1,2), (1,2,1) . . . may be renumbered as 1, 2, 3 . . . . An algorithm or a dimension table may be created that translates between the composite indexes tuples and the new numbering of the composite indexes. Then, the new numbering of the composite indexes may be used as a surrogate primary key or fictitious dimension that is referenced in the IOT instead of the tuples of the composite index.

Hardware Overview

Figure 6:
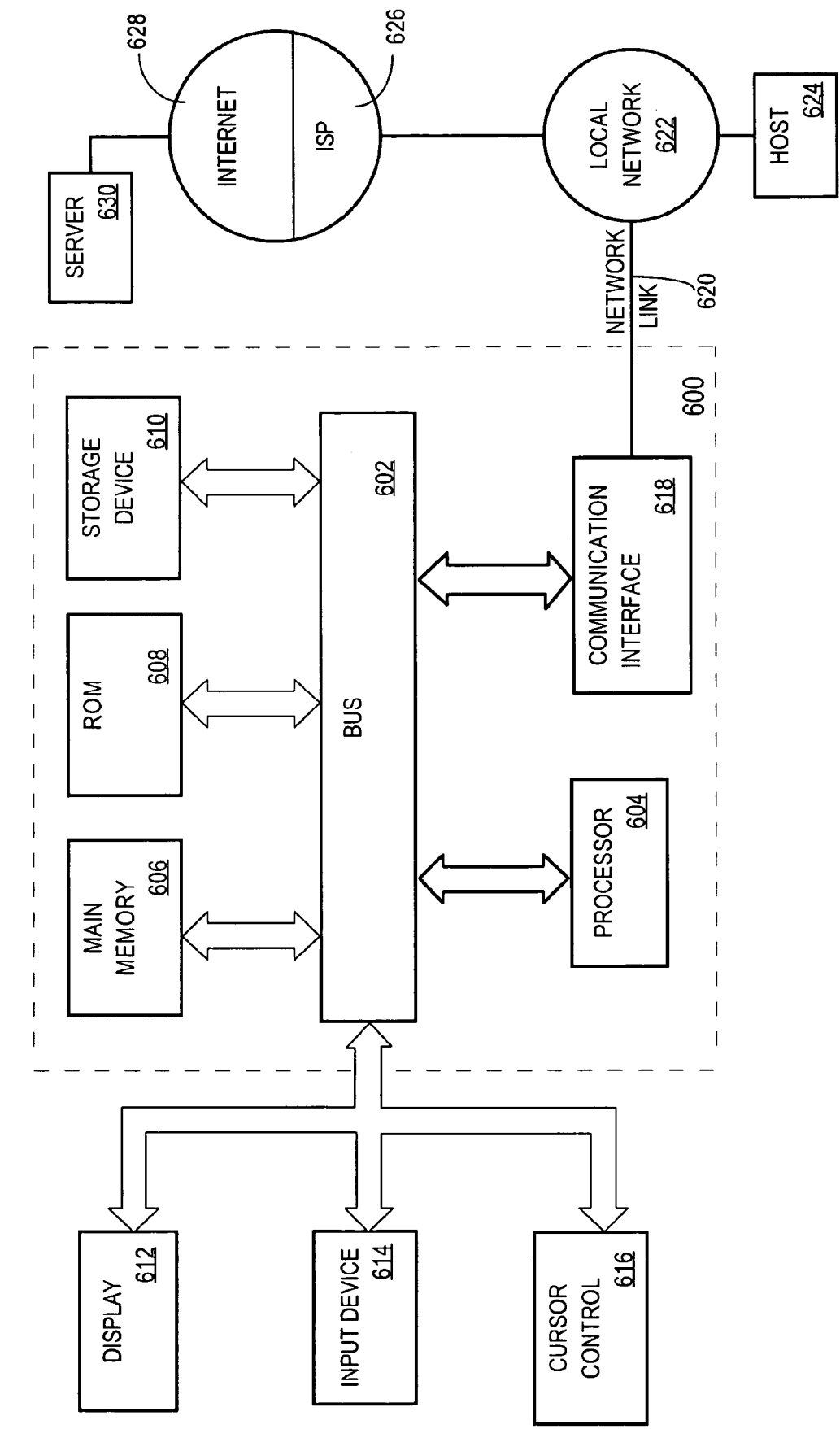
FIG. 6 shows an example of hardware that can be used as a database system within which the tables of the present invention are stored.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein, and computer system 600 may be a database having fact tables and IOTs as described above. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in storage of and/or providing instructions to processor 604 for execution. The computer readable medium may also store and/or provide instructions to processor 604 for the execution of a database management system, such as a relational database management system or any other database management system, incorporating instructions for handling tables according to the description above. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave. Local area network 662 may include a database server. Alternatively, host 624 may include a database server or a database server may be located remotely and accessed via ISP 626 and Internet 628, such as within sever 630 or elsewhere.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A machine implemented method comprising:
   accessing rows in a database table, wherein:
   each row in the database table corresponds to a dimension-value combination for a set of one or more dimensions;
   the database table is composed of a plurality of segments, wherein each segment of the plurality of segments (a) corresponds to a different contiguous range of dimension-value combinations and (b) includes a different set of one or more rows, wherein at least one segment of the plurality of segments includes multiple rows;
   the boundaries of each segment, of the plurality of segments, are established based on gaps in dimension-value combinations associated with rows stored in the database table;
   each gap covers at least one valid dimension-value combination that is not associated with any row in the database table;
   the segment into which a row of the database table is stored is the segment that corresponds to the contiguous range that includes the dimension-value combination to which the row corresponds;
   within each segment of the plurality of segments, rows of the database table are stored at locations based on the dimension-value combination to which the rows correspond; and
   wherein accessing rows in the database table includes, in response to receiving a request that indicates a particular dimension-value combination:

using the particular dimension-value combination for determining a segment of the plurality of segments that stores a particular row that corresponds to the particular dimension-value combination; and accessing the particular row within the segment.

2. The method of claim 1, wherein the database table (a) does not include columns for storing values for the one or more dimensions and (b) does not include columns for storing values that are derived from dimension values.

3. The method of claim 1, wherein sizes of the plurality of segments and locations contained within the plurality of segments are allocated according to a density of discontinuities in ranges of dimension value combinations.

4. The method of claim 1, wherein each of the plurality of segments is divided into one or more blocks of equal size.

5. The method of claim 1, wherein accessing the rows in the database table is also performed by at least accessing a table having an identification of a dimension value of a reference location included in the block from which offsets are calculated to other locations.

6. The method of claim 5, wherein the reference location is an index value of a first of location within a segment that stores rows for a contiguous range of dimension value combinations.

7. The method of claim 5, wherein the table having the identification is a B-tree index.

8. The method of claim 5, wherein the table having the identification is a bit map index.

9. A computer-readable storage medium storing one or more sequences of instructions, which when executed by one or more processors, causes the one or more processors to perform the method recited in claim 1.

10. A computer-readable storage medium storing one or more sequences of instructions, which when executed by one or more processors, causes the one or more processors to perform the method recited in claim 2.

11. A computer-readable storage medium storing one or more sequences of instructions, which when executed by one or more processors, causes the one or more processors to perform the method recited in claim 3.

12. A computer-readable storage medium storing one or more sequences of instructions, which when executed by one or more processors, causes the one or more processors to perform the method recited in claim 4.

13. A computer-readable storage medium storing one or more sequences of instructions, which when executed by one or more processors, causes the one or more processors to perform the method recited in claim 5.

14. A computer-readable storage medium storing one or more sequences of instructions, which when executed by one or more processors, causes the one or more processors to perform the method recited in claim 6.

15. A computer-readable storage medium storing one or more sequences of instructions, which when executed by one or more processors, causes the one or more processors to perform the method recited in claim 7.

16. A computer-readable storage medium storing one or more sequences of instructions, which when executed by one or more processors, causes the one or more processors to perform the method recited in claim 8.

17. A computer-readable storage medium that is readable by a database system, having stored therein at least a database table, wherein:

each row in the database table corresponds to a dimension-value combination for a set of one or more dimensions;

the database table is composed of a plurality of segments, wherein each segment of the plurality of segments (a) corresponds to a different contiguous range of dimension-value combinations and (b) includes a different set of one or more rows, wherein at least one segment of the plurality of segments includes multiple rows;

the boundaries of each segment, of the plurality of segments, are established based on gaps in dimension-value combinations associated with rows stored in the database table;

each gap covers at least one valid dimension-value combination that is not associated with any row in the database table;

the segment into which a row of the database table is stored is the segment that corresponds to the contiguous range that includes the dimension-value combination to which the row corresponds; and within each segment of the plurality of segments, rows of the database table are stored at locations based on the dimension-value combination to which the rows correspond;

the database table (a) does not store values for the one or more dimension columns and (b) does not store values that are derived from dimension values associated with the one or more dimension columns.

18. The computer-readable storage medium of claim 17 wherein the computer-readable storage medium also has stored therein at least:

another table storing identifiers for determining the locations stored within each segment of the plurality of segments.

19. A machine-implemented method comprising:

accessing rows in a database table, wherein:

each row in the database table corresponds to a dimension-value combination for a set of one or more of dimensions;

the database table is composed of a plurality of segments, wherein each segment of the plurality of segments corresponds to a different contiguous range of dimension-value combinations and (b) includes a different set of one or more rows, wherein at least one segment of the plurality of segments includes multiple rows;

the boundaries of each segment, of the plurality of segments, are established based on gaps in dimension-value combinations associated with rows stored in the database table;

each gap covers at least one valid dimension-value combination that is not associated with any row in the database table;

the segment into which a row of the database table is stored is the segment that corresponds to the contiguous range that includes the dimension-value combination to which the row corresponds;

wherein accessing rows in the database table includes, in response to receiving a request that indicates a particular dimension-value combination:

using the particular dimension-value combination for locating an entry in an index that includes a plurality of entries, wherein each segment of the plurality of segments is represented by a different single entry in the index; and accessing the particular row based on information contained in the index entry.

20. The method of claim 19, wherein:
the method further comprising creating the index; and
locating the entry is based in part on information contained in the entry that corresponds to the segment that contains the particular row.

21. The method of claim 19, wherein:
the index is an indexed organized table; and
locating the entry is based in part on information contained in the entry that corresponds to the segment that contains the particular row.

22. The method of claim 21, wherein the index organized table includes nonkey information used for determining locations of gaps in ranges of dimension value combinations that are between the segments.

23. The method of claim 21, wherein at least one of the plurality of segments includes more than one contiguous range of dimension value combinations.

24. The method of claims 21, wherein at least one of the plurality of segments comprises at least two contiguous range of dimension value combinations that are joined together by at least one dummy entry in the table, therein forming one contiguous range of dimension value combinations.

25. The method of claim 21, wherein the at least two of the plurality of segments are each divided into blocks having a block size, and the block size of a first of the at least two of the plurality of segments is different from the block size of a second of the at least two of the plurality of segments.

26. The method of claim 21, wherein the indexed organized table includes an identification of a reference location for each segment of the plurality of segments from which offsets from the reference location are calculated to reach other locations in each of the segments.

27. A computer-readable storage medium storing one or more sequences of instructions, which when executed by one or more processors, causes the one or more processors to perform the method recited in claim 20.

28. A computer-readable storage medium storing one or more sequences of instructions, which when executed by one or more processors, causes the one or more processors to perform the method recited in claim 21.

29. A computer-readable storage medium storing one or more sequences of instructions, which when executed by one or more processors, causes the one or more processors to perform the method recited in claim 22.

30. A computer-readable storage medium storing one or more sequences of instructions, which when executed by one or more processors, causes the one or more processors to perform the method recited in claim 23.

31. A computer-readable storage medium storing one or more sequences of instructions, which when executed by one or more processors, causes the one or more processors to perform the method recited in claim 24.

32. A computer-readable storage medium storing one or more sequences of instructions, which when executed by one or more processors, causes the one or more processors to perform the method recited in claim 25.

33. A computer-readable storage medium storing one or more sequences of instructions, which when executed by one or more processors, causes the one or more processors to perform the method recited in claim 26.

34. A computer-readable storage medium storing one or more sequences of instructions, which when executed by one or more processors, causes the one or more processors to perform the method recited in claim 19.

35. A machine-implemented method comprising:
determining a plurality of ranges based on dimension-value combinations to which rows in a table correspond;
wherein each range of the plurality of ranges is a different range of dimension-value combinations for a set of one or more dimensions;
wherein each row in the database table corresponds to a dimension-value combination;
wherein the plurality of ranges is determined such that the database table includes rows that correspond to every dimension-value combination that belongs to each range of the plurality of ranges;
wherein the boundaries of each range, of the plurality of ranges, are determined based on gaps in dimension-value combinations associated with rows stored in the database table;
each gap covers at least one valid dimension-value combination that is not associated with any row in the database table;
for each range of the plurality of ranges, creating a segment that stores only rows, from the table, that have dimension-value combinations that fall within the range that corresponds to said each segment.

36. The method of claim 35, further comprising storing rows, within each segment, in an order that is based on the dimension-value combinations of the rows.

37. The method of claim 35, wherein the rows (a) do not include columns for storing dimension-value combinations and (b) do not include any column for storing one or more values that are derived from dimension-value combinations.

38. The method of claim 35, further comprising creating an index that includes a single entry for each segment.

39. A computer-readable storage medium storing one or more sequences of instructions, which when executed by one or more processors, causes the one or more processors to perform the method recited in claim 35.

40. A computer-readable storage medium storing one or more sequences of instructions, which when executed by one or more processors, causes the one or more processors to perform the method recited in claim 36.

41. A computer-readable storage medium storing one or more sequences of instructions, which when executed by one or more processors, causes the one or more processors to perform the method recited in claim 37.

42. A computer-readable storage medium storing one or more sequences of instructions, which when executed by one or more processors, causes the one or more processors to perform the method recited in claim 38.

* * * * *

UNITED STATES PATENT AND TRADEMARK OFFICE
CERTIFICATE OF CORRECTION

PATENT NO. : 7,480,662 B2  Page 1 of 1
APPLICATION NO. : 10/719819
DATED : January 20, 2009
INVENTOR(S) : Potapov et al.

It is certified that error appears in the above-identified patent and that said Letters Patent is hereby corrected as shown below:

In column 2, line 29, delete "ID" and insert -- 1D --, therefor.

In column 4, line 39, delete ""South"," and insert -- "South," --, therefor.

In column 13, line 6, in Claim 2, delete "wherein" and insert -- wherein: --, therefor.

In column 14, line 27, in Claim 18, delete "17" and insert -- 17, --, therefor.

Signed and Sealed this

Seventeenth Day of August, 2010

David J. Kappos
*Director of the United States Patent and Trademark Office*